No. 746,795. PATENTED DEC. 15, 1903.
P. DANCKWARDT.
PROCESS OF MANUFACTURING ALKALI CYANIDS.
APPLICATION FILED JUNE 10, 1903.
NO MODEL.
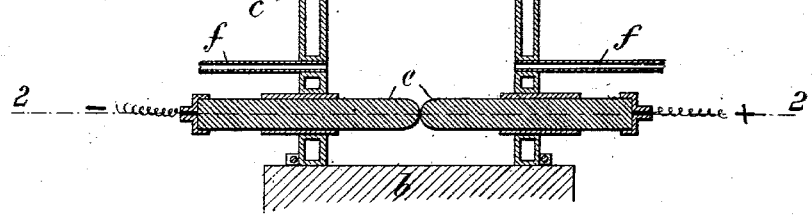
FIG. 1.
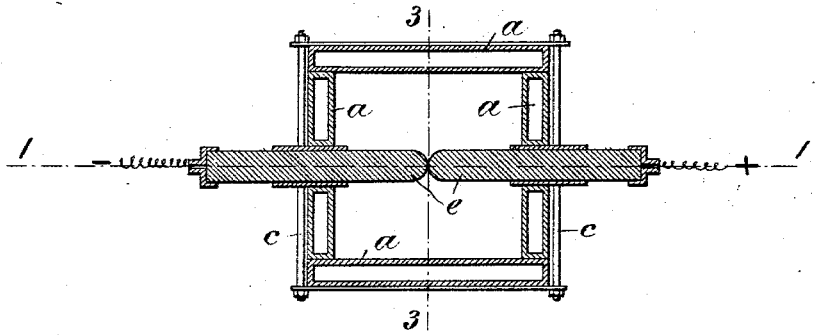
FIG. 2.
FIG. 3.
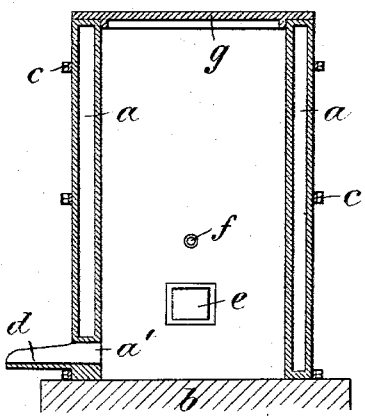
Witnesses:
Arthur Junger.
William Schulz
Inventor:
Paul Danckwardt
by his attorney No. 746,795.

Patented December 15, 1903.

UNITED STATES PATENT OFFICE.

PAUL DANCKWARDT, OF DEADWOOD, SOUTH DAKOTA.

PROCESS OF MANUFACTURING ALKALI CYANIDS.

SPECIFICATION forming part of Letters Patent No. 746,795, dated December 15, 1903.

Application filed June 10, 1903. Serial No. 160,865. (No specimens.)

*To all whom it may concern:*

Be it known that I, PAUL DANCKWARDT, a citizen of the United States, residing at Deadwood, Lawrence county, South Dakota, have invented certain new and useful Improvements in Processes of the Manufacture of Alkali Cyanids, of which the following is a specification.

This invention relates to a process of producing alkali cyanids by heating a mixture of a nitrid of an alkali-earth metal, an alkali salt, and a carbid of an alkali-earth metal in an atmosphere of nitrogen. As an alkali-earth nitrid I prefer to use magnesium nitrid, because it can easily be regenerated. As an alkali salt I prefer to use fluorid or sulfid of sodium, and as a carbid I employ calcium carbid, though barium carbid or aluminium carbid may also be used.

In order to regenerate the magnesium nitrid when it is being decomposed and to avoid the addition of this substance to every new charge, I use a furnace that has internal means for heating and is provided with supply-pipes for the introduction of nitrogen.

In the accompanying drawings, Figure 1 is a vertical section of a furnace for carrying my process into effect on line 1 1, Fig. 2. Fig. 2 is a horizontal section on line 2 2, Fig. 1; and Fig. 3 a vertical section on line 3 3, Fig. 2.

The furnace has a shape similar to a water-jacket blast-furnace. It may be square, oblong, or round, and is composed of a mantel of water-jackets $a$, which rest on a fireproof foundation $b$ and are held in position by braces and clamps $c$. One of the jackets $a$ has near its bottom a tap-hole $a'$, with a spout $d$. Two opposite jackets $a$ have openings for the introduction of one or more insulated carbon blocks $e$, which form the resistance for the current and effect the heating of the interior of the furnace. There are also in the jackets $a$ openings for the reception of pipes $f$, that supply gaseous nitrogen to the interior.

$g$ is a cover, and $h$ a flue connected with a stack. The flue $h$ has a valve $h'$ for regulating the pressure of the gases within the furnace.

In order to carry the process into effect by the above-described apparatus, I mix the three ingredients—viz., an alkali-earth nitrid, an alkali salt, and an alkali-earth carbid—in about the following proportions, by weight: one hundred parts of magnesium nitrid, eighty-five parts of fluorid of sodium, sixty-five parts of calcium carbid. This mixture is filled into the furnace until the charge reaches above the nitrogen-supply pipes $f$. I then fill the furnace up with a mixture of only the alkali salt and the alkali-earth carbid in about the following proportions, by weight: eighty-five parts of fluorid of sodium, sixty-five parts of calcium carbid. After the cover has been put on I start the electric current and force nitrogen into the furnace. If magnesium nitrid, fluorid of sodium, and calcium carbid have been used, there will set in a reaction, which may be expressed by the following formula:

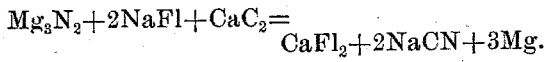

$$Mg_3N_2 + 2NaFl + CaC_2 = CaFl_2 + 2NaCN + 3Mg.$$

As the gases of magnesium will meet the nitrogen, they will combine again and will form magnesium nitrid. This magnesium nitrid on coming into contact with a new charge of fluorid of sodium and calcium carbid will again cause the first reaction, and so on.

It is important to have no oxidizing substances either in the charge or in the gas introduced, as that will considerably lower the output in sodium cyanid. It is the nascent carbon and the nascent sodium or alkali metal that are to react with the magnesium nitrid. If, however, there would be any oxygen present, both the sodium and carbon in *statu nascendi* would combine with the oxygen and form alkali carbonate instead of cyanid.

The product formed by my improved process—viz., a mixture of alkali cyanid and the fluorid of an alkali-earth metal—is drawn from the tap-hole $a'$. A new charge is added from time to time to keep the furnace as full as possible.

The mixture of alkali cyanid and the fluorid of the alkali-earth metal may be sold as such or refined into pure alkali cyanid by some known process.

What I claim is—

1. The process of making alkali cyanids, which consists in heating a nitrid of an alkali-earth metal, a salt of an alkali metal and a carbid of an alkali-earth metal under exclusion of air, substantially as specified.

2. The process of making alkali cyanids, which consists in heating a nitrid of an alkali-earth metal, a salt of an alkali metal and a carbid of an alkali-earth metal in an atmosphere of nitrogen, substantially as specified.

3. The process of making alkali cyanids, which consists in heating a nitrid of an alkali-earth metal, a salt of an alkali metal and a carbid of an alkali-earth metal in an atmosphere of nitrogen, adding a mixture of an alkali-metal salt and a carbid of an alkali-earth metal, and continuing the fusion, substantially as specified.

Signed by me at Deadwood, South Dakota, this 4th day of June, 1903.

PAUL DANCKWARDT.

Witnesses:
R. N. OGDEN,
G. E. HAINES.